INVENTOR
GORDON GARMIRE

ATTORNEYS

United States Patent Office 3,704,284
Patented Nov. 28, 1972

3,704,284
X-RAY POSITION DETECTOR
Gordon Garmire, Pasadena, Calif., assignor to California Institute of Technology, Pasadena, Calif.
Filed Dec. 4, 1970, Ser. No. 95,217
Int. Cl. G01t 1/18; H01j 39/28
U.S. Cl. 250—83.6 R          6 Claims

ABSTRACT OF THE DISCLOSURE

A set of proportional counters has been arranged into an array which can detect and indicate the position of an X-ray interaction within the array, in the X–Y plane.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to apparatus for indicating the location of X-rays in a plane, and more particularly to improvements therein.

The conventional arrangement for registering the presence and location of X-rays is to use X-ray film. After exposure the film has to be developed, and therefore, those situations where real time information is required or where the X-ray pattern changes, film cannot be used. Also, it is often times desirable to process the X-ray signals, that is to determine the instantaneous amplitude and distribution, and for this film also is not adequate.

OBJECTS AND SUMMARY OF THE INVENTION

An object of this invention is to provide apparatus which can detect the position of an X-ray interaction in the X–Y plane instantaneously.

Another object of this invention is to provide apparatus which can provide real time output signals which indicate the position of X-ray interactions in an X–Y plane.

Yet, another object of this invention is the provision of a novel and unique X-ray detecting apparatus.

These and other objects of the invention are achieved in an arrangement wherein a plurality of chambers are constructed in rows and columns or in an X–Y array. The chambers are immersed in an inert gas. The walls of the chambers are made conductive. A separate single wire runs through the chambers in each column. These wires are brought out to one side of the array. Row leads which are connected to the walls of adjacent conductive chambers are brought out to the other side of the array. X-rays directed at the array of chambers will enter the chambers causing the production of electrons and ions. The electrons are detected by the wires in each of the chambers and the ions are collected on the walls of the chambers. While ion collection time is relatively slow ($\sim$100 $\mu$sec.), however, an induced charge is created on a ground strip when the charge multiplication takes place at the anode wire in exact coincidence with the electron pulse on a time scale of 30 nanoseconds. It is this feature which makes the system quite useful, since rates up to 10,000 counts/second along each axis (X or Y) can be recorded without pulse amplitude degradation. Thus, by detecting the coincidence of output signals on a wire passing through a column of adjacent chambers and a wire connected to the walls of a row of chambers, one can determine the location of an X-ray.

DESCRIPTION OF THE PREFERRED EMBODIMENTS

Figure 1:
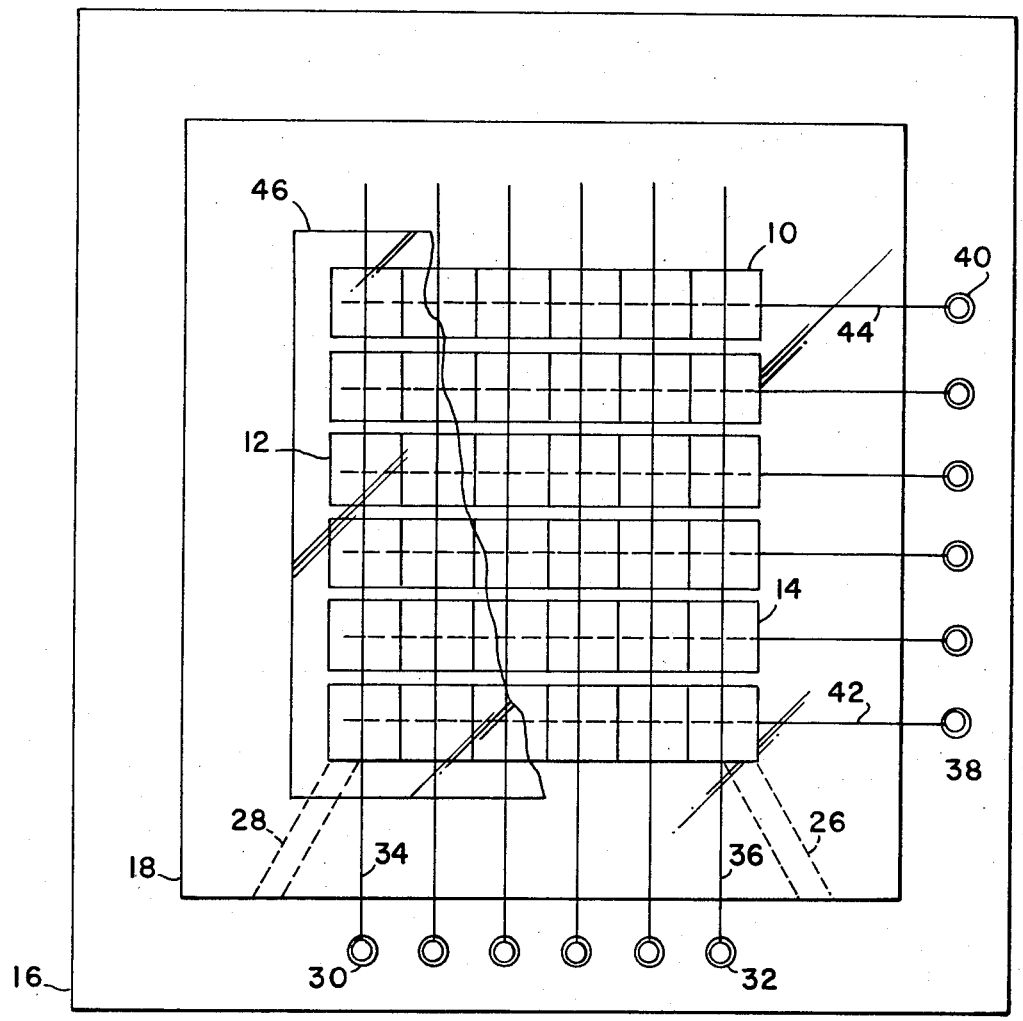
FIG. 1 is a view in elevation of an embodiment of the invention.
Figure 2:
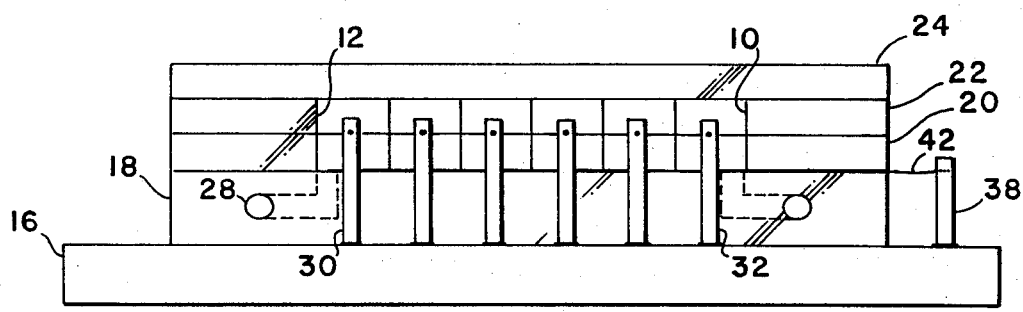
FIG. 2 is a plan view of the embodiment of the invention.
Figure 3:
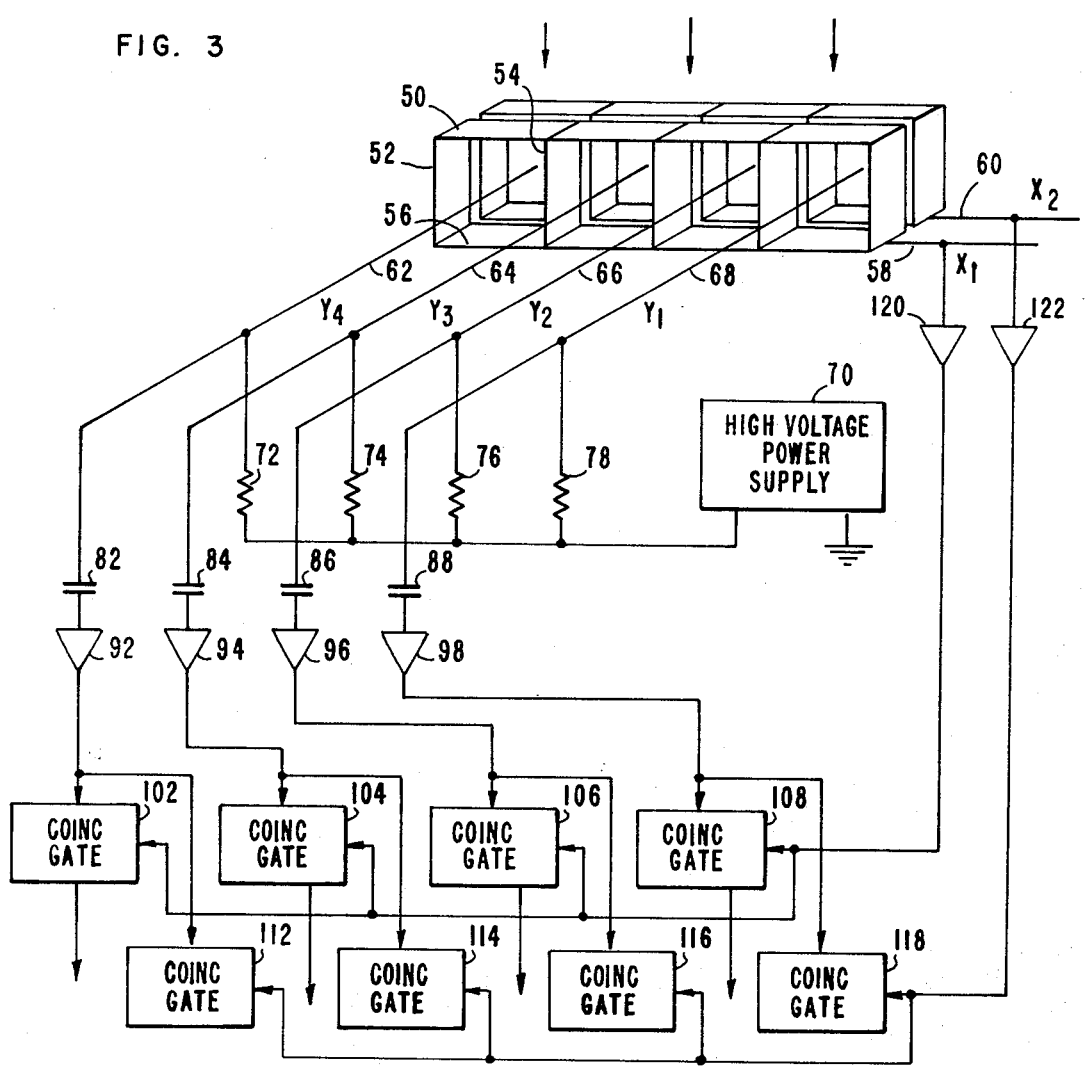
FIG. 3 is a detail of the embodiment of the invention showing how the cells are constructed and also illustrates the circuit arrangement for detecting the position of the X-rays.

Referring now to FIGS. 1 and 2, FIG. 1 shows a view in elevation of an embodiment of the invention and FIG. 2 is a plan view. The invention comprises an array of cells 10, 12, 14, for example, the details of which are shown in FIG. 3. These cells are sandwiched between sheets of plastic material such as Lucite. The sandwiching construction is provided so that the array of cells are in an opening into which an inert gas, such as nitrogen, may be introduced.

The plastic construction comprises a base 16 upon which a first smaller layer 18 is placed. The array of cells 10, 12, 14 are placed on the plastic layer 18. Two further plastic layers 20, 22 are placed on the layer 18 and have openings therethrough so that they fit over the cells. A covering layer 24 closes off the cells and together with the layers 20, 22 define a chamber in which the array of cells is placed. Openings respectively 26, 28 are made through the layer 18 to enable gas to be pumped into and out of the chamber in which the array is positioned.

Binding posts respectively 30, 32 are provided, one for each wire 34, 36, extending through each column of cells. Further binding posts respectively 38, 40, are provided, extending out of the base 16, one of these binding posts being provided for each wire respectively 42, 44 which connects to the walls of a row of cells. The rows of cells are insulatingly separated from one another by space.

One wall of the array of cells is a sheet of a thin plastic material, such as Mylar, 46. This is provided to enable X-rays to enter into the cells.

Referring now to FIG. 3 there is shown an enlarged perspective view of an appearance of some of the cells and their associated circuitry. The top 50 of each cell is covered by a thin Mylar window on the order to a quarter mil thick. The sides and bottom respectively 52, 54 and 56 of each cell is made of a conductive material such as a metal strip or groups of wires. The conductive walls of the cells in each row are connected together by conductors respectively 58, 60. A fine center wire respectively 62, 64, 66, 68, extends through the center of each column of cells.

The respective fine wire 62, 64, 66 and 68 are connected to a high voltage power supply 70 through the respective resistors 72, 74, 76 and 78. The respective fine wires couple through the respective capacitors 82, 84, 86 and 88, to the respective amplifiers 92, 94, 96 and 98. The respective amplifiers outputs are connected to the respective coincidence gates 102, 112, 104, 114, 106, 116, and 108, 118. The other required inputs to the respective coincidence gates are derived from the conductors respectively 58, 60, which connect to the respective rows of cells. The conductor 58 is connected through an amplifier 120 to the coincidence gates 102 through 108. The conductor 60 is connected through an amplifier 122 to the respective coincidence gates 112 through 118.

In operation, upon the entry of an X-ray into a cell, it produces electrons and ions from the gas present in the cell. The electrons are collected on the fine wire and the walls of the cell detect the initial polarization charge of the electron-ion cloud at the same time as the center wire detects the electron. These simultaneously occurring signals are applied by the row and column conductors to the coincidence gates. However, it is only the coincidence gate which receives inputs from both the center wire and row conductor that will emit an output signal. Thus, the location of the X-ray is indicated by the one of the gates that provides an output. It has been found that the timing is of the order of 30 nanoseconds, which allows rates of about 105 interactions per second per wire element before the device is overexposed in the photographic sense.

Figure 4:
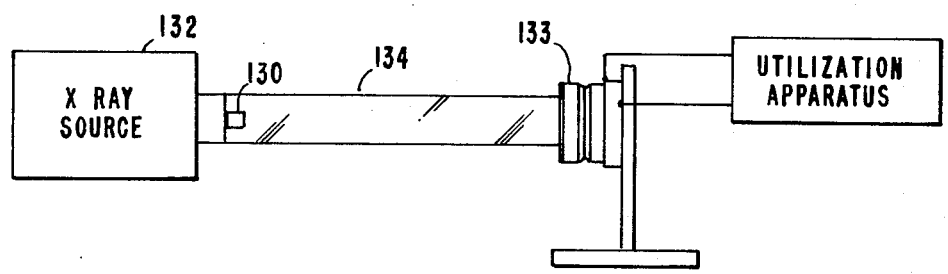
FIG. 4 illustrates how the embodiment of the invention is used.

FIG. 4 illustrates how the embodiment of the invention may be used. A sample 130, to be analyzed, is placed in front of a source of X-rays 132. The distance between the X-ray source and the position detector 133, is enclosed in a helium filled bag 134. This eliminates the necessity for placing the sample in a vacuum. The magnification of the X-ray image of the sample varies approximately as the fraction $d/s$ where $s$ is the distance of the sample from the tungsten filament in the X-ray source and $d$ is the distance from the sample to the X–Y position detector.

There are practical limitations on the spatial resolution of this invention, which is on the order of about 1 millimeter. While the resolution of film is about .004 millimeter, this invention is much more efficient (faster in the photographic sense) than film, allowing a "picture" to be taken with a much less X-ray exposure. The output of the coincidence gates may be scanned simultaneously with the scanning raster of a television tube and these outputs are applied to the intensity electrode of the tube whereby a picture of the same being X-rayed is viewed in real time. This has advantages in that an object can be rotated and moved to obtain a more complete analysis of the object. Once an interesting aspect of the object is discovered, a photograph of the TV display can be recorded or a direct X-ray photograph can be obtained for more detailed study. Thus, direct viewing in real time is possible, allowing the viewer to choose and record only those pictures of special interest. It is also noteworthy that using well known television techniques, any picture can be enlarged or reduced in size. Also, the outputs from the various coincidence gates can be applied to a computer for analysis or can be stored on magnetic film for subsequent utilization.

There has accordingly been described and shown herein a novel and useful X-ray X–Y position detector which can be used to indicate the location of X-rays and also to produce X-ray pictures in real time.

What is claimed is:

1. Apparatus for providing signals representative of the location of X-rays in a two dimensional plane which are directed at said plane comprising:
   means disposed over said two dimensional plane responsive to being bombarded by X-rays for generating an ion-electron cloud at the region of said bombardment,
   means spaced along a first dimension in said two dimensional plane responsive to the presence of electrons for producing an output indicative of the presence of electrons at a location along said one dimension and
   means spaced along a second dimension in said two dimensional plane responsive to the presence of ions for producing an output indicative of the presence of ions at a location along said second dimension whereby the location of X-rays in said two dimensional plane can be determined from the outputs of said means spaced along said first and second dimensions.

2. Apparatus as recited in claim 1 wherein said means in said two dimensional plane responsive to being bombarded by X-rays for generating an ion electron cloud constitutes an inert gas;
   said means spaced along a second dimension constitutes parallel spaced rows of chambers placed in said inert gas, said chambers having conductive walls and
   a separate row conductor for each one of the spaced rows of chambers for collecting an output signal generated by a chamber anywhere along a row;
   said means spaced along a first dimension constitutes for each column of chambers formed by all of the chambers in said parallel spaced rows a separate conductor passing through the chambers in said column for collecting an output signal occurring anywhere along said column.

3. Apparatus for providing signals representative of the location of X-rays in a two dimensional plane which are directed at said plane comprising:
   means disposed over said two dimensional plane for generating an ion-electron cloud upon being bombarded by X-rays in the region of said bombardment,
   an array of means arranged in columns and rows over said two dimensional plane, each means in said array generating a first signal responsive to the presence of electrons at said means and a second signal responsive to the presence of ions at said means,
   a separate first conductor means for each column of said array of means for collecting any first signal occurring along said column,
   a separate second conductor means for each row of said array of means for collecting any second signal occurring along said row, whereby the location of an X-ray in said plane can be established by the one of said first and said second conductor which provides respective first and second signals.

4. An X-ray position detector comprising:
   an array of cells arranged in columns and rows, each cell having conducting walls,
   a center wire for each column of cells, passing through all of the cells in a column,
   a row conductor for each row of cells connecting together all of the conductive walls of the cells,
   each cell having one wall made of a material pervious to X-rays, and
   means for filling each cell with a gas which produces an electron-ion cloud in response to the entrance of X-rays therein.

5. Apparatus as recited in claim 4 wherein there are provided walls for enclosing said array of chambers for establishing a gas containing chamber for said array of chambers.

6. Apparatus as recited in claim 4 wherein there are provided a plurality of coincidence gates, each center wire for each column of chambers is connected to as many coincidence gates of said plurality as there are rows of conductors, and each row conductor is connected to one coincidence gate to which each of the center wires are connected whereby the output of a coincidence gate is indicative of the presence of X-rays in the chamber connected to that center wire and row conductor.

References Cited
UNITED STATES PATENTS
3,418,474   12/1968   Spergel et al. _____ 250—83.6 R ARCHIE R. BORCHELT, Primary Examiner U.S. Cl. X.R.

313—93